United States Patent Office 3,489,593
Patented Jan. 13, 1970

3,489,593
METHOD OF SEALING VACUUM-DEPOSITED METAL COATINGS
Harvey M. Cohen, Randolph, and Ross Gardner, Stoughton, Mass., assignors to National Research Corporation, Cambridge, Mass., a corporation of Massachusetts
No Drawing. Filed Mar. 24, 1965, Ser. No. 442,505
Int. Cl. B44d 1/12; C23c 13/02
U.S. Cl. 117—71
8 Claims

ABSTRACT OF THE DISCLOSURE

Solid substrates are coated with a mixture of metal and polymer by vacuum evaporating the metal and condensing it in particulate form or as a porous coating and exposing the freshly deposited metal surface to a monomer fluid.

---

This invention relates to coatings and films and particularly to encapsulation of materials to provide stability to ambient air and moisture.

It is well known in the prior art to encapsulate solid substrates by vacuum deposition of a coating material on the substrate. For instance, the encapsulation of heat-sensitive particles with metal is described in Chemical and Engineering News, 39, 24–25 (June 26, 1961). However, the metal coatings tend to be quite porous and while this is advantageous for some purposes it compromises the storability of reactive particle substrates.

For instance, chemical rocket propellant ingredients are coated with metals to limit their reactivity with each other and with binder chemicals. While vacuum-deposited metal coatings are very suitable for this purpose, their porosity allows only a limited protection against moisture. Even where the substrate is inert, metal coatings must be supplemental to improve the storability of the coated substrate.

For instance, it is common practice in vacuum-coating certain paper and plastic webs with metal to provide a supplementary coat of lacquer to guard against degradation of the web and/or decreased adhesion of the coating due to atmospheric moisture.

It is the principal object of the present invention to provide a new method of sealing vacuum-deposited metal coatings to increase the degree of moisture protection afforded by the coatings.

It is a further object of the invention to provide an improved method of encapsulation which is especially well suited to particulate substrates.

It is a further object of the invention to provide a new method of promoting polymerization reactions for certain organic compounds through the use of a catalytic or initiating agent.

Other objects of the invention will in part be obvious and will in part appear hereinafter.

We have observed that when particulate substrates, freshly coated with vacuum-deposited aluminum, are exposed to vapors of divinylbenzene, styrene, methyl methacrylate, tetramethylene diacrylate or (1,3-butylene) dimethacrylate, a rapid polymerization occurs at the surface of the metallized particles and a solid shell is formed. While the detailed mechanism of initiation by the aluminum surface has not been determined, it is believed that reactivity is due to unsaturated valence forces of the aluminum. The method is generally applicable to initiating anionic polymerization reactions, although its preferred and best use is in the sealing of coatings.

The invention accordingly comprises the improved encapsulation process for sealing metallized substrates generally and a new combination of process steps for sealing particulate substrates and the products of these processes, all of which are exemplified in the following detailed disclosure and the scope of the application of which will be indicated in the claims.

According to a preferred embodiment and usage of the invention, powders or pellets are aluminized using the apparatus shown in the above article. During the coating process the substrate particles are tumbled on a cooled vibratory plate. The process is carried out at pressures less than $10^{-3}$ mm. Hg and preferably on the order of $10^{-4}$ mm. Hg. By regulating the time of coating and aluminum evaporation rate controlled thicknesses of aluminum can be formed on the particles. Then a stream of monomer vapor mixed with an inert gas carrier is passed over the aluminized particles. Solid, continuous polymer shells are formed over the entire particle. It has been found that the moisture resistance of the particle is increased by the formation of the shells.

EXAMPLE 1

Crystals (−14+20 mesh) of nitronium perchlorate were vacuum-coated with aluminum in varying amounts (between 1 and 20% by weight). The aluminized crystals were then reacted with DVB–55, a mixture of divinylbenzene (55%) ethylvinylbenzene (40%) and diethylbenzene stabilized with 1000 p.p.m. para-tert.-butylcatechol. A white material was formed in the pores of the aluminum coating. The thickness of the white material was directly related to the thickness of the aluminum coating. The thickness of the white material after 5 minutes of exposure to the monomer was essentially the same as after 85 hours of exposure. Microscopic examination showed that the white coating was 5 microns thick on a 1.5% (by weight) aluminum-coated sample and 42 microns thick on a 16% aluminum-coated sample.

The composition of the white coating in the above example was determined by placing samples on folded glass fiber filter pad in a perforated filter core, and dissolving out the aluminum and nitronium perchlorate with dilute sodium hydroxide. The remaining hard white hulls were washed and dried to 50–60° C. to remove all sodium hydroxide and solvent and then combusted at 1100° C. The resultant $CO_2$ was measured and the percent polydivinylbenzene determined conductometrically.

These results were confirmed by comparing the infrared spectra of samples with other specimens of DVB–55 polymerized with tin tetrachloride as the initiator.

EXAMPLE 2

Several samples of 16% aluminum-coated nitronium perchlorate samples were reacted with DVB–90 (86.8% divinylbenzene, 6% ethylvinylbenzene, 4.2% naphthalene). The resultant polydivinylbenzene coatings were 1–4%.

EXAMPLE 3

Samples from Examples 1 and 2 and unreacted samples were tested for average time for reaction with water vapor.

| Monomer | Percent polymer coat | Time for reaction (minutes) |
|---|---|---|
| | 0 | 1 |
| DVB–55 (Ex. 1) | 6.6 | 42 |
| DVB–90 (Ex. 2) | 3.6 | 6 |

EXAMPLE 4

Sodium chloride particles were coated with aluminum by vapor deposition and reacted with monomers of methylmethacrylate, 3-butylene dimethacrylate, tetramethylene diacrylate, DVB–55, pure DVB and styrene in liquid and gaseous forms to form polymer hulls. In each instance the hull was solid except in the case of methyl methacrylate wherein a gel was produced. Reactions with liquid monomers formed more polymer than reaction with gaseous monomers.

The method of the invention can also be practiced using other coating metals—beryllium, copper, iron, magnesium, tin and titanium—instead of aluminum. In each instance, the present process radically changes the catalytic properties of the metal compared to its effectiveness in bulk form. Useful monomers whose polymerization can be initiated are styrene, alkyl styrene, divinylbenzene, acrylates, methacrylates, diacrylates, and dimethacrylates. When the monomer fluid is in liquid form, the choice of monomer must be limited to chemicals whose polymer is insoluble in its monomer. In this connection, it has been noted that styrene, when polymerized according to the method of the present invention, forms a polymer insoluble in its monomer. It thus appears that the polystyrene was cross-linked.

The metal coatings will be effective with styrene base and acrylic base monomers which do not include highly electronegative groups (e.g. CN in conjugation with the double bond). Where the monomer contains highly electronegative groups, the reaction is believed to proceed primarily by interaction of the nucleophilic atom with the aluminum surface and this appears to be the primary mechanism rather than polymerization. The formation of fresh metal surface for polymerization is not limited to the preferred vacuum deposited aluminum coatings. For instance, particles with fresh aluminum surface can be formed by the vacuum evaporation process of Allen disclosed in U.S. Patent 3,049,421, protected from oxidation reaction and then exposed to a monomer fluid to initiate polymerization of the fluid.

Since changes can be made in the above processes and products without departing from the scope of the invention herein involved, it is intended that the above materials shall be read as illustrative and not in a limiting sense.

What is claimed is:

1. A method of forming coatings comprising the steps of vacuum-depositing a metal coating on a substrate, protecting the freshly deposited coating from oxidation reaction and then exposing the coated substrate to an unpolymerized styrene base or acrylic base organic compound of the type in which polymerization can proceed by anionic mechanism to produce a polymer coating by polymerization of the compound in situ at the metal surface solely by catalytic effect of the metal coating upon the organic compound.

2. The method of claim 1 wherein the organic compound is in the liquid phase and contains a monomer capable of forming a polymer insoluble in said monomer.

3. The method of claim 1 wherein the organic compound is in the vapor phase.

4. A method of initiating a polymerization reaction solely by catalytic effect, of acrylic base or styrene base compounds, comprising the steps of vacuum-depositing a metal on a substrate and exposing the freshly-coated metal to an unpolymerized vapor of the compound to be polymerized the monomer being selected from the group consisting of compounds whose polymerization can proceed by anionic mechanism.

5. A method of initiating an anionic polymerization reaction solely by catalytic effect, comprising the steps of forming particles with fresh metal surface under non-contaminant medium and exposing the new metal surface to a styrene base or acrylic base monomer fluid the monomer being selected from the group consisting of compounds whose polymerization can proceed by anionic mechanism.

6. The method of claim 5 wherein the fresh metal surface is formed under vacuum, the pressure being less than $10^{-3}$ mm. Hg.

7. The method of claim 5 wherein the metal is selected from the group consisting of aluminum, beryllium, copper, iron, magnesium, tin and titanium.

8. A method of encapsulating nitronium perchlorate crystals by vacuum depositing an aluminum coating thereon and then exposing the freshly deposited aluminum surface to divinylbenzene monomer whereby a shell of polydivinylbenzene is formed as a mixture with and a thin overcoat for the aluminum coating to enhance the moisture stability of the crystals.

References Cited

UNITED STATES PATENTS

| 2,940,872 | 6/1960 | Gusman et al. | 117—75 |
| 3,107,198 | 10/1963 | Ambroski et al. | 117—71 |
| 3,118,786 | 1/1964 | Katchman et al. | 117—71 |

FOREIGN PATENTS 518,312  2/1940  Great Britain.

REUBEN EPSTEIN, Primary Examiner

U.S. Cl. X.R.

149—8; 117—75, 132, 107